Patented May 15, 1951

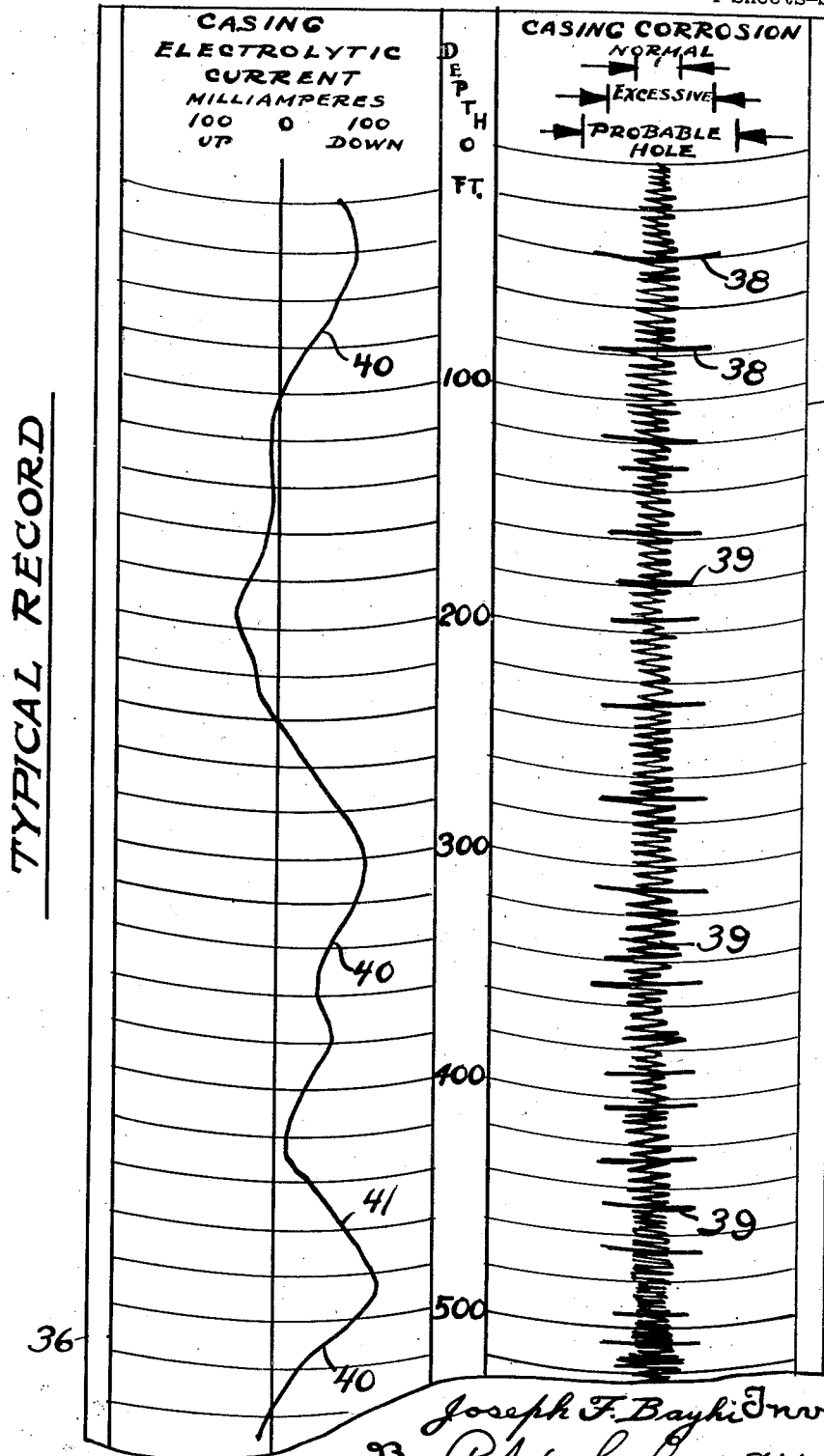

2,553,350

UNITED STATES PATENT OFFICE 2,553,350

METHOD AND APPARATUS FOR DETECTING CORROSION

Joseph F. Bayhi, Tulsa, Okla., assignor to Standard Oil Development Company, a corporation of Delaware Application April 17, 1947, Serial No. 742,069

5 Claims. (Cl. 175—183)

The present invention is directed to a method and apparatus for detecting corrosion in pipes. More particularly it is directed to such a method and apparatus peculiarly adapted for detecting corrosion in pipes which are sunk in the earth.

It has already been proposed to examine pipes, particularly sunken pipes, for evidence of corrosion by passing a magnetic scanner through the pipe in such a way that at least a portion of the pipe is always in the field of the scanner. Deformities in the pipe occurring in the magnetic field cause changes in the magnetic field and these changes are utilized to produce signals. The signal is produced by having a coil arranged on the scanner in such a manner as to be in the field of force.

In arrangements of this type already proposed the lines of magnetic force emanating from the magnetic scanner and passing into at least a portion of the pipe traverse a gap between the scanner and the pipe. Variations in this gap tend to create variations in the magnetic field. These variations are reflected in the signals produced.

It is the principal object of the present invention to provide a magnetic scanner of the type indicated in which the signals produced will be substantially unaffected by variations in the gap between the scanner and the metal pipe being studied.

An important object of the present invention is to provide a method and apparatus of the type indicated wherein there are simultaneously produced indications of the existence of corrosion in the pipe and indications of whether the corrosion is on the inside or outside of the pipe.

More specifically it is an object of the present invention to provide a method and apparatus for logging a bore hole casing or other buried pipe by simultaneously producing a magnetic log indicating the existence of deformities in the pipe and an electrolytic current log which provides information from which it can be deduced whether the deformities are on the interior or exterior of the pipe.

A more specific object of the present invention is the provision of a method and apparatus for simultaneously producing logs of the aforesaid character continuously.

Other objects and advantages of the present invention will appear from the following detailed description of the accompanying drawing, in which;

Figure 5 is a replica of the type of logs produced by the use of the apparatus.

Figure 1:
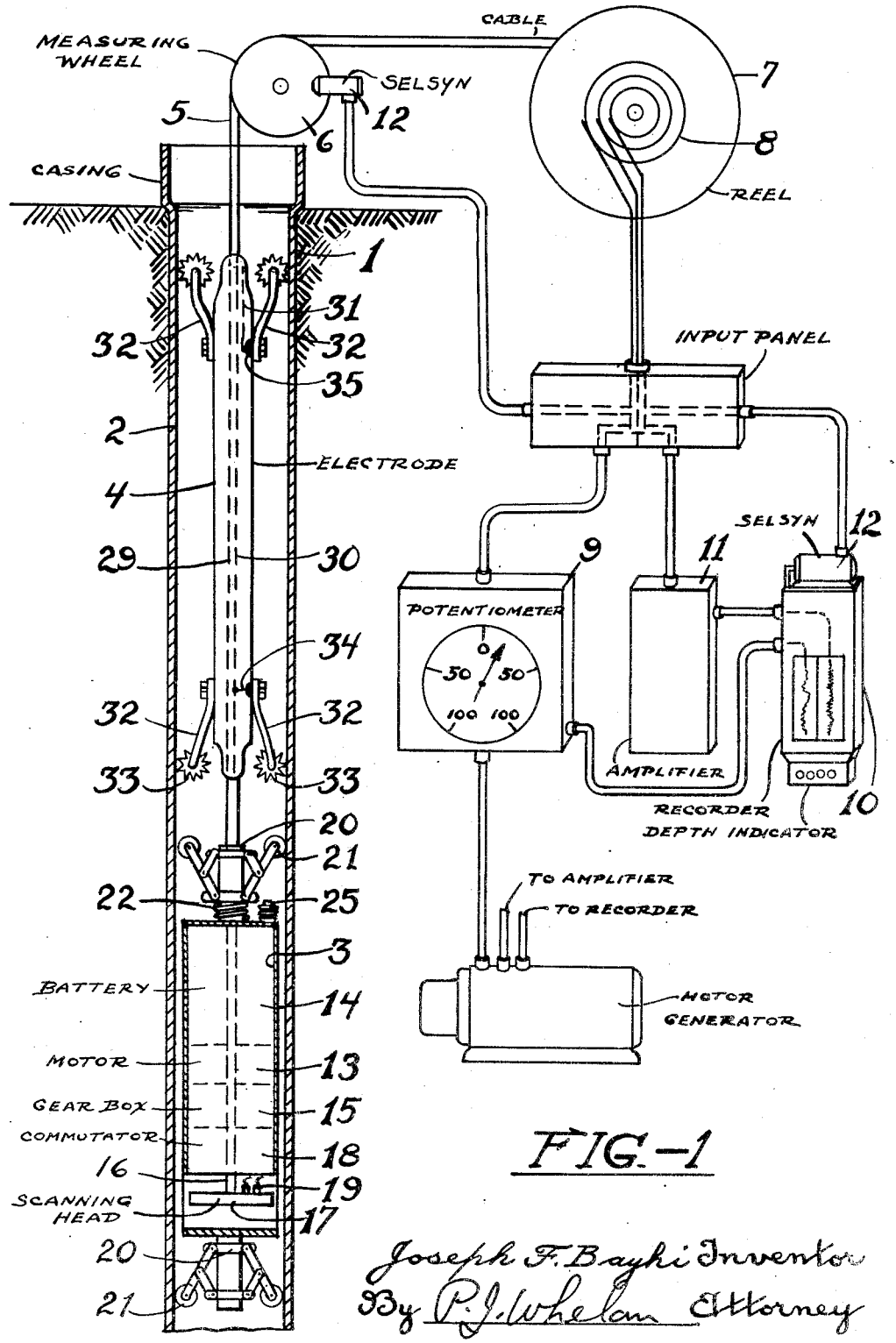
Figure 1 is a side elevation partly in section and partly schematic in character of a logging arrangement according to the present invention.
Figure 2:
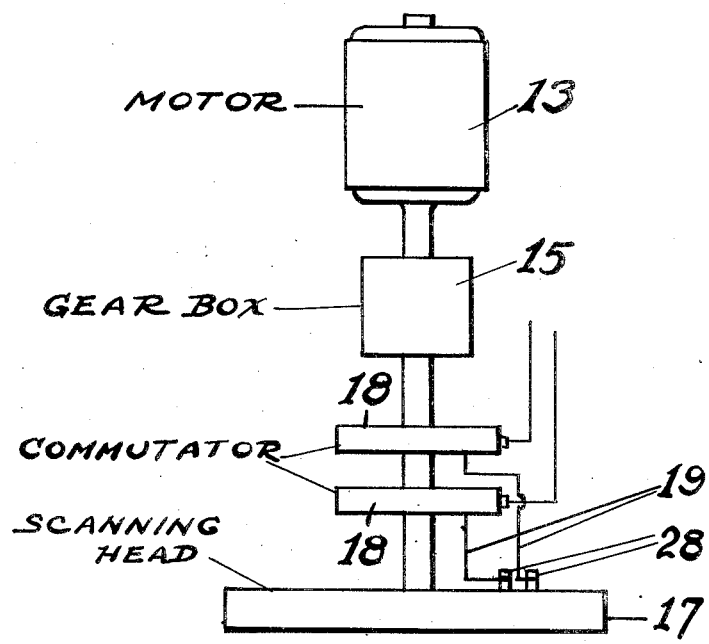
Figure 2 is a detail showing the connection between the motor and the scanner in Figure 1.

Referring to Figure 1 in detail, numeral 1 designates a bore hole in which is set casing 2. The logging assembly of the present invention includes a bomb 3 carrying the magnetic scanner and its operating mechanism, and an electrode 4 for producing signals indicative of the electrolytic currents along the casing. Both of these devices are carried at the end of a cable 5 which is provided with suitable conductors for bringing the signals to the surface.

As is usual in well logging operations the cable 5 is threaded over a measuring wheel 6 and is wound on a reel 7 on the shaft of which the conductors in cable 5 are connected to a slip ring arrangement 8. That signal received at the slip ring arrangement which reflects the electrolytic currents in the casing is conducted to a potentiometer 9 from which it passes to a recorder 10, which may be a pen recorder or a recording galvanometer or similar device. That signal received at the slip ring arrangement 8 which reflects the magnetic field along the casing is conducted to an amplifier 11 and from there to the recorder 10. Thus there are two traces produced by the recorder, the one representing electrolytic current and the other representing the magnetic signals indicative of casing deformation. It will be observed that the record drive for the recorder is synchronized with the movement of the measuring wheel by the use of "Selsyn" motors 12 in the conventional manner. In view of the fact that the magnetic scanner is spaced a few feet from the electrolytic electrode it is desirable to adjust the position of the recording elements on the record at the outset to compensate for this space so that the records may be directly compared. In the case of a pen recorder this may be simply done by spacing the pen which records the electrolytic current behind the pen recording the magnetic signals a distance on the record strip corresponding to the actual spacing between the electrode and the scanner.

Inside the bomb 3 there are arranged in any suitable fashion a motor 13 driven by a battery supply 14 and connected to a gear box 15 from which extends a shaft 16 carrying the magnetic scanner 17. Mounted on the shaft 16 is also a suitable commutator or slip ring arrangement 18 which receives the output from the scanner through conductors 19.

At either end of the bomb is a centering device composed of spaced sliding collars 20 linked in the usual manner to rollers 21 which are continuously spring pressed against the wall of the casing by a spring 22.

Figure 3:
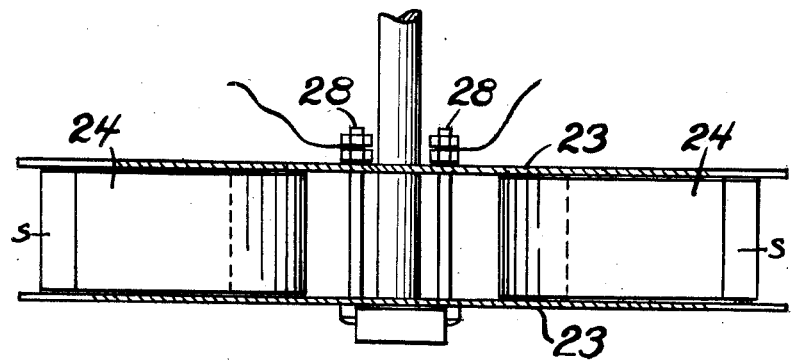
Figure 3 is a side view of the scanner.
Figure 4:
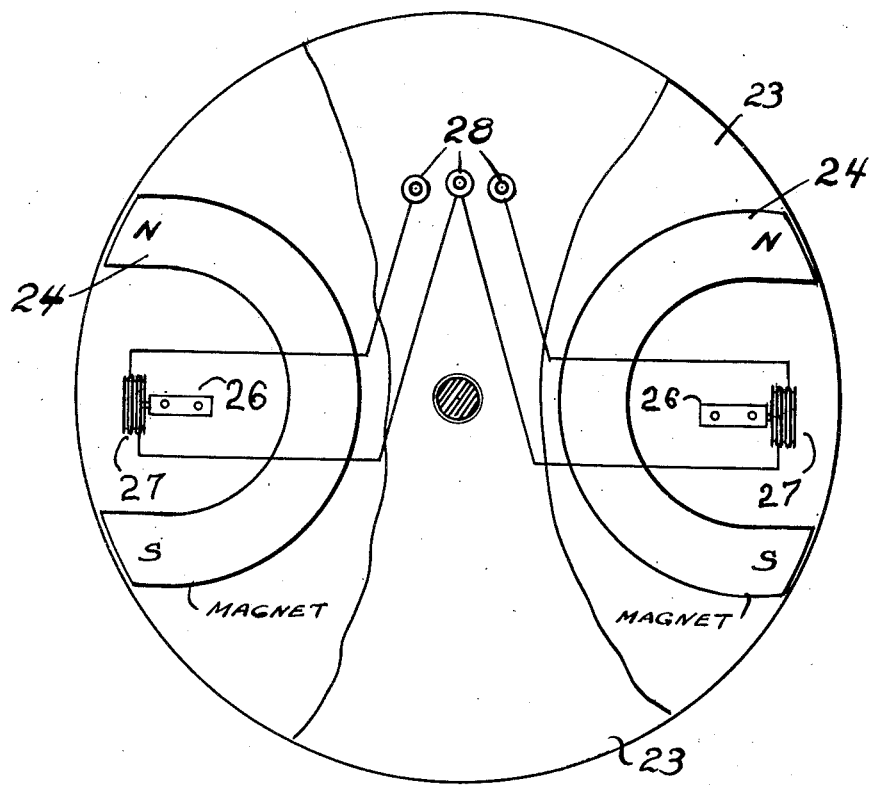
Figure 4 is a plan view of the scanner with parts broken away to show the interior construction.

The scanner itself may assume many forms. One suitable embodiment thereof is shown in Figures 3 and 4. In this embodiment the scanner is composed of two non-magnetic plates 23, suitably bolted together and carrying between them in diametrically opposed relation a pair of substantially U-shaped magnets 24. Strong magnets such as "Alnico 5" magnets are preferably utilized in order to eliminate the effect of any natural magnetism in the casing. These magnets are arranged with their pole pieces substantially flush with the periphery of the plates so that there shall be a minimum of clearance between these pole pieces and the wall of the bomb 3. In this connection it may be mentioned that the wall of the bomb 3, is made of thin non-magnetic material such as brass and is preferably of such a diameter that it passes through the casing with a minimum of clearance. In order that the walls of the bomb shall not collapse under pressures encountered in the casing the bomb is preferably supplied with one or more bellows type nozzles 25, through which liquid such as kerosene can be introduced into the bomb, filling it, whereby pressure differentials between the outside and the inside of the bomb can be compensated for by expansion and contraction of the bellows type nozzle.

Carried by one of the plates between the pole pieces of each magnet is a bracket 26, of "Bakelite" or other insulating material to which is fixed a coil 27, having a non-magnetic core, which is preferably disposed as close as possible to the wall of the bomb. Suitable coils for this purpose may be made of #40 fine magnet wire and may have about 200 turns. It will be understood that it is desirable to have the maximum possible number of turns without unduly increasing the impedance of the coil. The terminals of the coil are connected to binding posts 28, of which the center one is a common terminal. The conductors 19, are also connected to these binding posts and to the commutator arrangement 18.

It is to be particularly noted that the coils in the embodiment shown are physically independent of the magnets. Thus the coils are not directly in the field of force travelling through the magnets so that variations in that field of force caused by variations in the gap between the pole pieces and the casing do not directly affect the coils.

There are two possible theories to explain how deformities in the casing induce a voltage in the coil when it is arranged as shown. It may be postulated that where the casing is uniform the field between the poles will be distributed between the casing and the free space between the poles in such a manner as to cut the coil and that this field will remain uniform until a deformity in the casing is encountered. Upon the occurrence of a deformity the reluctance of that portion of the casing including the deformity is changed and that change will also vary the reluctance in that portion of the magnetic field in which the coil is disposed, thus inducing a voltage in the coil. A more acceptable theory is that the occurrence of a deformity in that portion of the casing included in the magnetic field causes the lines of force actually to leave the casing and move into the free space occupied by the coil thereby changing the field in which the coil is located and inducing a voltage into it. This theory seems to be supported by the fact that the signal produced by the coil as a result of a deformity in the casing remains substantially the same regardless of the distance between the pole pieces in the plane in which the coil is located. Thus the pole pieces may be laterally spaced from each other any desired distance between 1" and 5" or more.

It will be observed that the magnets are arranged with their poles oppositely disposed. This arrangement serves many purposes. In the first place in different areas the earth's magnetism may be of different polarity; that is to say, in one area the north polarity may predominate while in another element the predominant polarity is south. For any given earth polarity the two magnets will produce signals of different intensity. Consequently by providing the two magnets it is possible to determine in any given area which one will give the strongest signal and this one will be used in that area.

In addition it is frequently desirable to use both magnets simultaneously, producing two records. Since only a section of the casing is embraced in the magnetic field of each magnet it will be apparent that by using both magnets simultaneously the actual area of the casing covered in a single run will be twice that covered when a single magnet is used. Likewise, it is contemplated that the coils for the respective magnets may be of different character so that by the simultaneous use of the two magnets it is possible to produce two records, one of which will usually have signals of greater intensity than the other. In some cases it may be desired to have the sensitivity of one coil so great that it will pick up very small pits in the casing. With such a sensitivity difficulty might be encountered in keeping the trace on the record when large deformities are encountered. To provide for this the other coil may be made less sensitive, thereby obtaining a quantitative value for all pits.

Referring back to Figure 1 it will be observed that the cable carries three conductors 29, 30, and 31. Conductor 30 is a common conductor which through the slip ring arrangement is connected to the middle post 28. Conductor 29 is connected through the slip ring arrangement to one of the other posts 28. The electrode 4, which may be of "Bakelite" or other suitable material, carries in its either end spring arms 32, which are usually at least three in number. Rotatably mounted on the free end of each arm is a knurled or toothed roller 33, which is continuously spring pressed against the casing wall. At least one of the spring arms at the lower end of the electrode is connected through contact 34, with the common conductor 30. At least one of the spring arms at the upper end of the electrode is connected through contact 35, with conductor 31. It will be understood that when the two magnets in the scanner are used simultaneously another conductor will be provided in the cable.

Referring to Figure 5, numeral 36 designates a record strip carrying a trace indicative of the electrolytic current along the casing, the intensity of the current being shown by the lateral position of the trace and depth being shown longitudinally along the trace. Numeral 37 designates a record strip of the output of the magnetic scanner recorded against depth. In this trace it will be observed that there are periodic large pulses 38, which are uniformly spaced and which indicate the location of joints. In this case there is a continuous output of the scanner which is to be expected where the casing is lap welded. If the casing were seamless the trace between the joint markers would be a straight line if no deformities existed in the casing. Deviations in the record beyond the background value, such as those indicated by numeral 39, indicate the presence of deformities in the casing, but they do not indicate whether the deformities are on the inside or outside of the casing. The electrolytic record, however, aids in the interpretation of the scanner record in this connection. It is a characteristic of the electrolytic record that where a decay of electrolytic current occurs such as indicated at points 40 on the record strip, corrosion pits will occur on the outside of the casing. Consequently, when an abnormal signal such as 39 appears between 300 and 400 feet on the scanner record and this is accompanied by a decay of electrolytic current at the same location on record strip 36 it may be concluded that the corrosion is probably on the outside of the casing. On the other hand when an abnormal signal such as 39 between 400 and 500 feet appears on the scanner record and the electrolytic record shows at the same point an increase in current, indicated by numeral 41, it can be safely concluded that this corrosion is most likely on the inside of the casing. Interpretation of these records is facilitated when a caliper log of the casing is available.

In the foregoing discussion reference has been made primarily to the locating of corrosion in borehole casings. It will be understood that the methods and arrangement discussed are applicable also to the study of any buried pipe, such as buried pipe lines.

The particular embodiment of the present invention illustrated and described above is intended only as one exemplification of the present invention. Many changes of design and structure will occur to those skilled in the art and are embraced in the present invention. The relative locations and proportions of the various parts are, within limits, a matter of choice and do not represent any departure from the inventive concept. Likewise the manner in which the method is conducted is a matter in which a wide latitude of choice is permitted. For example, the rate at which the assembly is passed along the casing and the rate at which the scanner is rotated may vary within fairly wide limits. A convenient procedure is to lower the assembly through the casing at a fairly rapid rate, say at about fifty feet per minute, whereby a record is produced on which deformities do not appear in very great detail. Then the assembly can be drawn upwardly through the casing and its rate of travel reduced in passing those sections in which the existence of deformities is suggested by the down travel record, such reduced rate of travel being conveniently about 10 feet per minute. While this reduced rate of travel is employed, the record strip itself may be speeded up so that any desired degree of detail on the record can be realized.

It will be understood that the intensity of the signal produced will be a function of the rate of rotation of the scanner, the higher this rate the greater the amplitude of the signal. A convenient rate of rotation is about 100 R. P. M.

The nature and objects of the present invention having been thus described and illustrated, what is claimed as useful and is desired to be secured by Letters Patent is:

1. An apparatus for logging casing in a borehole comprising a pair of longitudinally spaced electrical contact points, means for pressing said contact points into contact with the inner wall of said casing, a U-shaped magnet disposed for rotation in a plane perpendicular to the longitudinal axis of said casing having its pole pieces disposed closely adjacent the inner wall of said casing, a coil arranged in the field of said magnet said coil having a non-magnetic core, means for moving the aforesaid assembly of parts along said borehole, means for simultaneously rotating said magnet, means at the surface for simultaneously and separately recording current flow between said contact points and E. M. F. generated in said coil, said surface recording means being electrically connected to said electrical contact points and to said coil and being adapted to record simultaneously said current flow and said E. M. F. with respect to each other and with respect to the position of said electrical contact points and of said coil in said casing.

2. An apparatus according to claim 1 including means for maintaining said magnet in spaced relation to the inner wall of said casing.

3. A magnetic scanner for pipes comprising a non-magnetic rotatable member, a pair of diametrically opposed U-shaped magnets carried by said rotatable member with their pole pieces disposed in a plane perpendicular to the axis of the rotatable member, like poles of the magnets being oppositely disposed in said plane, a pair of coils having non-magnetic cores, one of each of said coils being disposed between the pole pieces of one of each of said magnets, and means for connecting the terminals of each of said coils to indicating apparatus.

4. An apparatus for logging casing in a bore hole comprising a pair of longitudinally spaced electrical contact points, means for pressing said contact points into contact with the inner wall of said casing, a pair of diametrically opposed U-shaped magnets disposed for rotation in a plane perpendicular to the longitudinal axis of said casing, the magnets being disposed in said plane closely adjacent to the inner wall of said casing, the like poles of said magnets being oppositely disposed in said plane, a coil with a non-magnetic core arranged in the field of each of said magnets, means for moving the aforesaid assembly of parts along said bore hole, means for simultaneously rotating said magnets, means at the surface for simultaneously and separately recording current flow between said contact points and E. M. F. generated in said coils, said surface recording means being electrically connected to said electrical contact points and to said coils and being adapted to record simultaneously said current flow and said E. M. F. with respect to each other and with respect to the position of said electrical contact points and of said coil in said casing.

5. A method for detecting deformities in a pipe beneath the earth's surface which comprises passing along the interior of the pipe a means creating in the vicinity thereof a normally stable magnetic field, simultaneously passing along the interior of the pipe a pair of spaced contacts adapted to contact the pipe at longitudinally spaced points, simultaneously detecting current flow between said contacts and variations in said magnetic field, and recording at the earth's surface, simultaneously with respect to each other and with respect to the position of said contacts and said magnetic field creating means within said pipe, indications of said current flow and indications of said magnetic field variations.

JOSEPH F. BAYHI.

REFERENCES CITED

The following references are of record in the file of this patent:

UNITED STATES PATENTS

| Number | Name | Date |
|---|---|---|
| Re. 15,859 | Burrows | June 17, 1924 |
| 2,179,240 | Breitenstein | Nov. 7, 1939 |
| 2,207,592 | Lenk | July 9, 1940 |
| 2,255,053 | Gunn | Sept. 9, 1941 |
| 2,308,159 | Drummond et al. | Jan. 12, 1943 |
| 2,371,658 | Stewart | Mar. 20, 1945 |